2,949,457
Patented Aug. 16, 1960

2,949,457

CERTAIN 2-PHENYL-IMINO-3-PHENYL-THIAZOLIDINE-4-ONES

Renat Herbert Mizzoni, Long Valley, N.J., assignor to Ciba Pharmaceutical Products, Inc., Summit, N.J., a corporation of New Jersey No Drawing. Filed Nov. 28, 1958, Ser. No. 776,755

2 Claims. (Cl. 260—240)

This invention relates to new thiazolidine-4-one compounds. More particularly, the invention concerns 2-phenyl-imino-3-phenyl-thiazolidine-4-ones, in which each of the phenyl radicals contains in the 4-position a group of the formula Py—(CH=CH)$_n$—, in which Py represents a pyridyl group and $n$ stands for a whole number from 1 to 2, and the salts thereof, as well as process for the preparation of such compounds.

Pyridyl is represented by 3-pyridyl, 4-pyridyl, or especially by 2-pyridyl groups, which are preferably unsubstituted or may contain lower alkyl, e.g. methyl or ethyl; nitro or amino groups or halogen atoms, e.g. chlorine or bromine, as substituents.

Salts of the new compounds of this invention are, particularly, therapeutically acceptable acid addition salts, for example, those with inorganic acids, such as hydrohalic acids, e.g. hydrochloric or hydrobromic; sulfuric or phosphoric acids; or those with organic acids, such as formic, acetic, propionic, glycolic, lactic, oxalic, malonic, maleic, tartaric, citric, hydroxymaleic, dihydroxymaleic, benzoic, salicylic, 4-aminosalicylic, methane sulfonic, ethane sulfonic or hydroxyethane sulfonic acid. Mono- or bis- salts may be formed.

The new thiazolidine-4-one compounds and the salts thereof inhibit the growth of various types of Mycobacteria, such as *Mycobacterium tuberculosis*, e.g. the human pathogenic strain H37 Rv of *Mycobacterium tuberculosis*, or *Mycobacterium leprae*, and may be used as antitubercular or antileprotic agents. For example, a good tuberculostatic activity may be obtained with 2-phenyl-imino-3-phenyl-thiazolidine-4-ones, in which each of the phenyl radicals contains in 4-position a 2-(2-pyridyl)-ethenyl group.

The new compounds may be used as medicaments in the form of pharmaceutical preparations, which contain the new thiazolidine-4-ones or the salts thereof or mixtures of such compounds in admixture with a pharmaceutical organic or inorganic, solid or liquid carrier suitable for enteral, e.g. oral, or parenteral administration. For making up the preparations there may be employed substances which do not react with the new compounds, such as water, gelatine, lactose, starches, stearic acid, magnesium stearate, stearyl alcohol, talc, vegetable oils, benzyl alcohols, gums, waxes, poly-alkylene glycols, petroleum jelly or any other known carrier for medicaments. The pharmaceutical preparations may be in solid form, for example, as tablets, capsules or dragees, or in liquid form, for example, as solutions, suspensions or emulsions. If desired, they may contain auxilairy substances, such as preserving agents, stabilizing agents, wetting or emulsifying agents, salts for varying the osmotic pressure or buffers. They may also contain, in combination, other therapeutically useful substances, particularly, other tuberculostatic reagents, such as streptomycin, dihydrostreptomycin, 4-amino-salicyclic acid or isonicotinic acid hydrazide, or other leprostatic compounds, such as sulfones, e.g. thiazolsulfone.

The new thiazolidine-4-ones and salts thereof may be prepared by reacting a 1,3-diphenyl-2-thiourea, in which each of the phenyl radicals contains in the 4-position a group of the formula Py—(CH=CH)$_n$—, in which Py and $n$ have the above-given meaning, with a mono-halogeno-acetic acid, a lower alkyl ester or a halide thereof, and, if desired, converting any resulting salt into the free base, and/or converting a free base obtained into a salt thereof.

A monohalogeno-acetic acid, a lower alkyl ester or a halide thereof is, particularly, a chloroacetic or bromo-acetic acid, the methyl or ethyl esters, or the chloride thereof. The reaction is preferably carried out in a solvent, the selection of which is based on the type of reagent used, for example, a lower alkanol, e.g. ethanol, if desired, in the presence of an alkali metal salt of a lower alkanoic acid, e.g. sodium acetate; an aromatic hydrocarbon, e.g. benzene; a halogenated hydrocarbon, e.g. chloroform; or a lower carboxylic acid in the presence of an alkali metal salt of such an acid, e.g. glacial acetic acid in the presence of sodium acetate. If desired, the reaction may be completed more rapidly by refluxing the mixture for 2 to 8 hours. Any unreacted 2-thiourea which contaminates the final product, may be identified by infrared studies or by the formation of an insoluble black precipitate upon addition of lead acetate to an alcoholic solution of the product. If necessary, the reaction may be completed by reacting the product containing any unreacted thiourea with an additional amount of the α-halogeno-acid or an ester thereof.

The starting materials used in this reaction may be prepared according to methods known for the preparation of analogous compounds. Thus, symmetrically substituted 1,3-diphenyl-2-thioureas may be prepared by reacting an appropriately substituted aniline with thiophosgene or carbon disulfide; for example, 4-[2-(2-pyridyl)-ethenyl]-aniline, when reacted with carbon disulfide in the presence of potassium ethyl xanthate, yields the 1,3-bis-{4-[2-(2-pyridyl)-ethenyl]-phenyl}-2-thiourea. Asymmetric 1,3-diphenyl-2-thioureas may be prepared by treating a substituted phenylisothiocyanate with a substituted aniline. The thioureas may also be used in the form of their acid addition salts.

If asymmetrically substituted thioureas are used the new thiazolidine-4-one derivatives may be obtained as a mixture of two isomers, which may be separated into the two single compounds by ordinary methods, such as fractionated crystallization, adsorption and fractionated elution, etc. The mixture may also be used as such.

Depending on the condition used the new compounds are obtained in the form of the free bases or salts thereof. A salt may be converted into the free base in the customary way, for example, by treatment with an aqueous alkaline medium, such as an alkali metal hydroxide, e.g. sodium or potassium hydroxide; an alkali metal carbonate, e.g. sodium carbonate or potassium hydrogen carbonate; or ammonia. A free base may be transformed into its therapeutically acceptable acid addition salts by reaction with appropriate inorganic or organic acids, e.g. the acids outlined above, for example, in a lower alkanol, e.g. methanol, ethanol, propanol or isopropanol, solution. A reaction product may also be obtained in the form of a hydrate; mono- or poly-salts may be formed.

The following example is intended to illustrate the invention, and is not to be construed as being a limitation thereon. Temperatures are given in degrees centigrade.

Example

A mixture of 43.5 g. of 1,3-bis-{4-[2-(2-pyridyl)-ethenyl]-phenyl}-2-thiourea, 10.4 g. of chloroacetic acid and 16 g. of anhydrous sodium acetate is suspended in 300 ml. of ethanol and refluxed for 6 hours. The solution is filtered, the solvent removed and the residue extracted with benzene. The benzene is evaporated under reduced pressure and the 2-{4-[2-(2-pyridyl)-ethenyl]-phenyl} - imino - 3 - {4 - [2 - (2 - pyridyl) - ethenyl]-phenyl}-thiazolidine-4-one is recrystallized from a mixture of benzene and methanol.

The hydrochloride may be prepared by treating an ethanol solution of the thiazolidine-4-one with hydrogen chloride and adding ether.

The starting material may be prepared as follows: A solution of 15.7 g. of 4-[2-(2-pyridyl)-ethenyl]-aniline, 7.6 g. of carbon disulfide and 0.1 g. of potassium ethyl xanthate in 100 ml. of methanol is refluxed for two hours. A precipitate is formed after about 1½ hours, which is filtered off after cooling. The resulting 1,3-bis - {4 - [2 - (2 - pyridyl) - ethenyl] - phenyl} - 2-thiourea is recrystallized from a mixture of chloroform and petroleum ether, M.P. 190–192°.

By reacting 1-{4-[2-(4-pyridyl)-ethenyl]-phenyl}-3-{4 - [4 - (2 - pyridyl) - butadienyl] - phenyl} - 2 - thiourea, obtained by reacting 4-[4-(2-pyridyl) butadienyl]-aniline with 4-[2-(4-pyridyl)-ethenyl]-phenylisothiocyanate, with chloroacetic acid in the presence of sodium acetate according to the above-given procedure a mixture of 2-{4-[2-(4-pyridyl)-ethenyl]-phenyl}-imino-3-{4 - [4 - (2 - pyridyl) - butadienyl] - phenyl} - thiazolidine-4-one and 2-{4-[4-(2-pyridyl)-butadienyl]-phenyl}-imino - 3 - {4 - [2 - (4 - pyridyl) - ethenyl] - phenyl}-thiazoline-4-one is obtained.

What is claimed is:

1. A member of the group consisting of 2-phenyl-imino-3-phenyl-thiazolidine-4-one, in which each of the phenyl radicals is substituted in the 4-position by the group of the formula Py—$(CH=CH)_n$—, in which Py stands for a member of the group consisting of 2-pyridyl, 3-pyridyl and 4-pyridyl, and $n$ for a whole number from 1 to 2, and the therapeutically acceptable acid addition salts thereof.

2. 2 - {4 - [2 - (2 - pyridyl) - ethenyl] - phenyl}-imino - 3 - {4 - [2 - (2 - pyridyl) - ethenyl] - phenyl}-thiazolidine-4-one.

References Cited in the file of this patent

UNITED STATES PATENTS 2,857,393     Mizzoni _____ Oct. 21, 1958